United States Patent
Carpentier et al.

[15] 3,657,738
[45] Apr. 18, 1972

[54] RADAR SYSTEMS

[72] Inventors: Michel F. Carpentier; Robert G. L. Guilhem, both of Paris, France

[73] Assignee: Thomson-CSF, Paris, France

[22] Filed: Dec. 5, 1969

[21] Appl. No.: 882,469

[52] U.S. Cl. ............................................343/12 R, 343/14
[51] Int. Cl. ..............................................................G01s 9/04
[58] Field of Search.................................................343/12 R, 14

[56] References Cited

UNITED STATES PATENTS

| | | | |
|---|---|---|---|
| 2,965,896 | 12/1960 | Wright et al. | 343/14 X |
| 3,577,143 | 5/1971 | Poirier | 343/12 R |

Primary Examiner—T. H. Tubbesing
Attorney—Flynn & Frishauf

[57] ABSTRACT

A radar system referred to as a noise radar system operating in a continuous or quasi-continuous mode, which transmits a noise signal toward a target. The receiver signal from the target is summed up with a replica of the transmitted signal and the composite signal obtained is processed in a first multichannel receiver wherein it is directed in a preferred manner, to square law detectors. The signal issuing from the detectors is a sinusoid the frequency of which is proportional to the range of the target. This signal is then processed in another multichannel receiver through a switch which transforms the spatial representation delivered at the output of the detectors into a temporal representation, the range information being obtained at the output of a distance channel of the second receiver.

11 Claims, 1 Drawing Figure

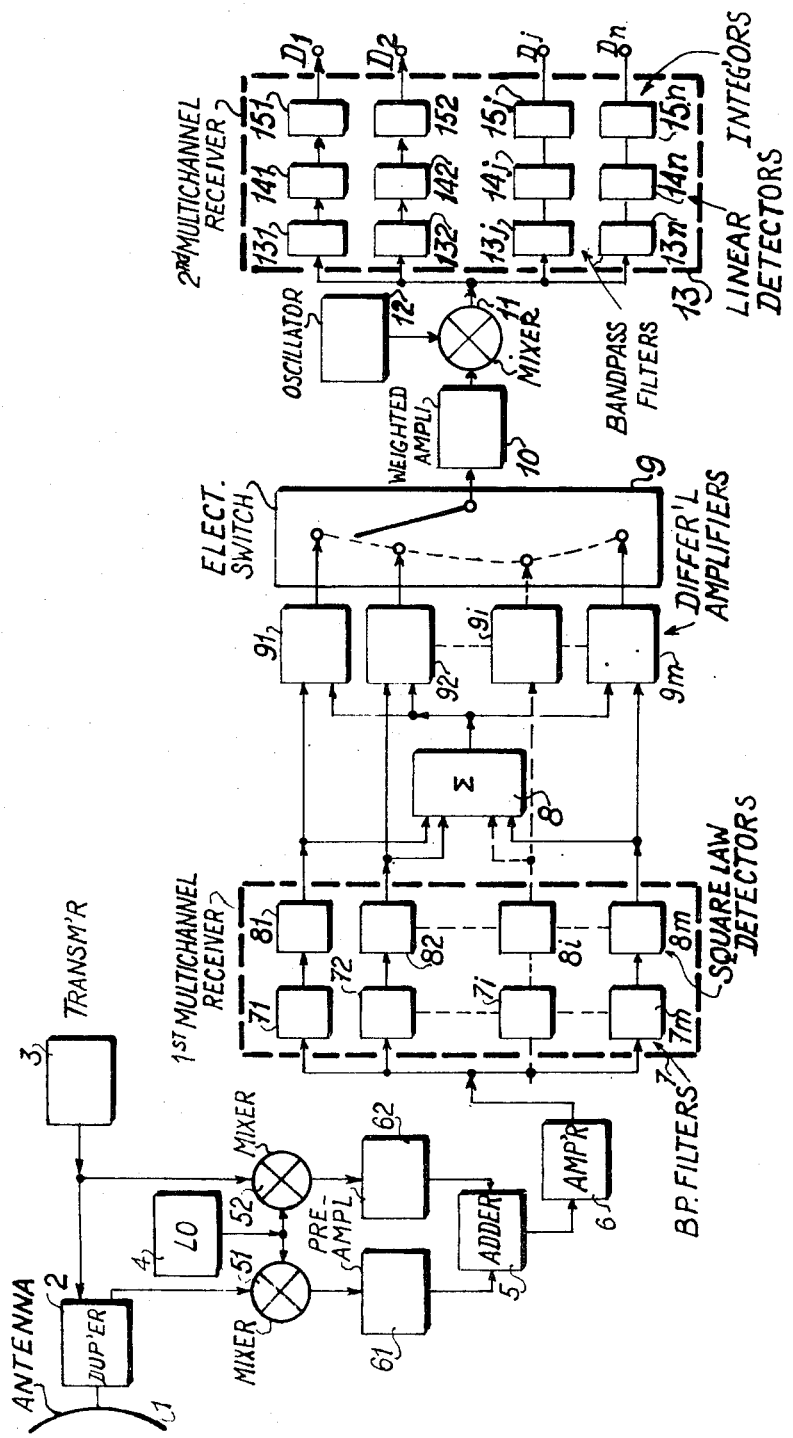

RADAR SYSTEMS

DESCRIPTION

The present invention relates to improvements in radar systems. It concerns more especially noise radar operating in a continuous or quasi-continuous mode, wherein a great resolution in range is obtained without exhibiting the drawbacks encountered in conventional noise radar.

In such conventional noise radars, the transmission code generally is memorized so as to provide for a range selection by using cross-correlation techniques. But a system according to this prior art is all the more complex and expensive as the necessary storage means is important.

An object of the instant invention is to overcome these drawbacks by providing a radar system exhibiting a great resolution in range, while not using a storage means.

According to the invention, there is provided in a radar system comprising means for transmitting a signal toward a target and means for receiving a return signal from said target in response to said transmitted signal, means for combining said return signal with a replica of said transmitted signal to build a composite signal, means for applying said composite signal to detecting means wereby a target range information is carried as a function of the frequency of the output signal of said detecting means and means for applying said latter signal to range channel network whereby to obtain said range information at the output of at least one of said range channels.

The outputs of said receiver feed through an electronic switch to the inputs of a second multichannel receiver, delivering at its output the desired range information.

Other objects, features and advantages of the invention will become more readily apparent from the following detailed description of a preferred embodiment, reference being made to the accompanying drawing representing as a block diagram the radar system according to the invention.

In this system, the transmitter 3 is connected to the transmit-receive antenna 1 through a duplexer 2. The transmitter is further connected through an optional delay element, which is not represented in the drawing, to a mixer 52 fed by a local oscillator 4 which also feeds another mixer 51 connected to the output of duplexer 2. The outputs of both mixers 51 and 52 are applied to a network 5 through preamplifiers 61 and 62 respectively. A wide band-pass amplifier 6 connects this network, wherein the signals issued from 51 and 52 are added, to the $m$ inputs of a multichannel receiver 7. The outputs thereof simultaneously apply to the $m$ inputs of a second network 8 summing up these outputs and also to one of the inputs of the differential amplifiers $9_1$ to $9_m$, the other input thereof receiving the output of network 8. The outputs of these $m$ differential amplifiers $9_1$ to $9_m$ connect each to the successive terminals of a $m$ position electronic switch 9, the output of which applies to the $m$ inputs of a second multichannel receiver 13. Said second receiver delivers the required range information at one of its outputs $D_1$ to $D_n$.

The first multichannel receiver 7 consists of band-pass filters $7_1$ to $7_m$, followed by detectors which preferentially are square law detectors $8_1 - 8_m$. The second multichannel receiver 13 consists of band-pass filters $13_1$ to $13_m$ followed by linear detectors $14_1$ to $14_m$. The outputs of said latter detectors are advantageously connected to integrators $15_1$ to $15_m$. Further, a weighted amplifier 10 followed by a mixer which receives a low frequency local oscillation from local oscillator 12, is advantageously switched-in between the output of electronic switch 9 and the input of the second multichannel receiver 13.

In the said designed radar system, the network 5 sums up the received signal with a replica of the signal which is available at this moment, after these signals being changed to the intermediate frequency range through mixers 51 and 52 connected both to local oscillator 4 and preamplified in circuits 61 and 62 respectively. The resulting signal from network 5 is transmitted through a wide-band amplifier 6 before applying simultaneously to the $m$ inputs of the first multichannel receiver 7.

As the signal transmitted by 3 is a continuous or a quasi-continuous signal, as for instance a white noise signal, it is easy to demonstrate that at the outputs of square law detectors $8_1$ to $8_m$ the characteristic curve representing the average value of the detected voltage in terms of the rank of the channel of receiver 7 is a sinusoidal curve the frequency F of which is proportional to the range D of the target. It is thus possible to obtain at the output of said first receiver 7 the desired range information by measuring the frequency F of the signal. This latter however being usually mixed with a high amplitude noise, the measure of a frequency is not easy and cannot give an accurate result. It is then convenient to provide a second multichannel receiver 13 which is likely to remove the above mentioned drawback while improving the signal to noise ratio. As the signals issuing from detectors $8_1$ to $8_m$ of receiver 7 have a continuous component, this latter is cancelled, as not carrying information, before these signals arrive to the second receiver. Summing network 8 therefore, delivers the average value of the signal amplitude. Differential amplifiers $9_1$ to $9_m$ then subtract this mean value from each of the signals before they are transmitted to the electronic switch 9. The graph of the amplitude of the signal which is applied to the m inputs of the switch 9, as a function of the rank of these inputs is a spatial representation consisting of a sinusoid. The electronic switch 9 should make a temporal representation correspond to this spatial representation, the axis of the sinusoid becoming the time axis. The signal obtained at the output of the switch 9 is then applied to the $n$ channels of the second receiver 13.

The desired range information D is obtained from at least one of the outputs $D_1$ to $D_n$ of this receiver 13 as a function of the temporal frequency of the signal which is applied to the input of the channels. The integrators $15_1$ to $15_m$ are provided in this second multichannel network in order to increase the signal to noise ratio, their time constant being chosen as the average time of presence of an echo within the beam of the antenna 1. Possible range ambiguities are cancelled by connecting the output of the switch 9 to a weighted amplifier 10. Besides, the switching-in of a mixer 11 between switch 9 and the second multichannel receiver 13, which mixer is fed with the low-frequency local oscillation from oscillator 12, operates a frequency transformation, making easier the filtering by means of band-pass filters $13_1$ to $13_n$.

The spatial frequency of signals representing distant targets is very high, as the ranges to be measured increase it becomes important that the frequency band $B_1$ of each of the m channels of the first multichannel network 7 be small. The band-pass $B_1$ is advantageously chosen so as to be smaller than $$\frac{c}{4D_{max}}$$

where c is the light velocity and D max the maximum range of the radar.

Calling $T_1$ the switching time of switch 9, i.e., for instance, in a mechanical representation of the switch considered for simplification purpose, the time elapsing between two successive passages of a slider upon a same terminal, $T_1$ is advantageously chosen so as to satisfy the relation $T_1 <$ $$\frac{1}{2B_1}$$

resulting in a minimum loss of information. Further, if $T_2$ represents the reading time, i.e., the time spent by the slider to pass from the output of amplifier $9_1$ to that of amplifier $9_m$, $T_2$ is advantageously chosen so as to satisfy the relation $T_2 << T_1$. Besides, the band-pass $B_2$ of each of the filters $13_1$ to $13_n$ of the second receiver 13 is advantageously chosen so as to satisfy the relation $B_2 <$ $$\frac{1}{2T_2}$$

resulting in a minimum number of channels for the receiver 13, the maximum number of said channels depending upon the range accuracy which is required.

In the foregoing, a multichannel receiver 13 has been contemplated. It is possible to use a receiver with a single distance channel instead of a plurality thereof. In one case, obviously when only a single range is searched. In another case, all the required ranges can be searched by means of said single channel by modifying the rate of operation of the switch 9.

In the above disclosure a radar system has been described which exhibits a high range resolution while being of a simple design enabling easy range measurements, without being spoiled by the possible presence of noise.

In particular, this system does not show "blind ranges" as is the case in conventional coherent and noise radars, these latter using cross-correlation techniques. Further the range resolution cell of the radar, object of the invention, is independent of the transmission signal duration.

When it is not necessary to rapidly process the range information obtained, the above described system may be simplified by replacing receiver 13 by a conventional spectrum analyzer, which successively analyses all the ranges although this simplification increases the time necessary to afford the searched range D with respect to the more elaborated system described.

Another change may be introduced in the above described system, in applications where the signal to noise ratio may be kept within large tolerances. The assembly consisting of receiver 7, summing network 8, amplifiers $9_1$ to $9_m$ and switch 9 is replaced by a second spectrum analyzer which is conventional, a filter being switched-in between said first and second analyzers. Such a system is advantageous over the other described systems by being of a simpler design and offering a low cost, but its performance is not so high as it is with the other systems.

The preceding description has been given as non limitative example of a search radar. But it should be understood that other types of radar fall within the scope of the invention.

What is claimed, is:

1. In a radar system comprising means for transmitting a signal toward a target and means for receiving a return signal from said target in response to said transmitted signal; means for adding said return signal to a replica of said transmitted signal to build a composite signal; means for applying said composite signal to detecting means wereby a target range information is carried as a function of the frequency of the output signal of said detecting means and means for applying said latter signal to range channel network whereby to obtain said range information at the output of at least one of said range channels.

2. A radar system according to claim 1, wherein said detecting means is a square law detecting means.

3. A radar system according to claim 1, wherein said means for applying said detected signal to said range channels is a switching means.

4. A radar system according to claim 3, wherein said composite signal issuing from said adder circuit applies through a large band-pass amplifier to a first multichannel network and each channel of said network comprises a detecting means fed through a band-pass amplifier, all said detecting means feeding on the one hand a summing network and on the other hand said switching means.

5. A radar system according to claim 4, wherein said detected signal applies to said switching means through differential amplifying means, each said differential amplifying means delivering a signal which is the difference between the signal issuing from the corresponding channel and the average value of said detected signal issuing from said summing network, the signal applying to said switching means carrying said range information as a function of the frequency of said signal, being further a spatial representation in terms of the rank of the channels of said multichannel network.

6. A radar system according to claim 5, wherein said switching means has its output feeding, to a plurality of range channels of a second multichannel network, each of said range channels comprising a band-pass filter, a linear detector, and an integrator whereby the required range information is obtained at the output of at least one of said range channels as a function of the temporal frequency of the signal obtained at the output of said switching means.

7. A radar system according to claim 6 wherein a weighted amplifier is provided between said output of said switching means and said plurality of range channels of said second multichannel network.

8. A radar system according to claim 6 wherein said switching means has a reading time T2 and each channel of said second multichannel network has a band-pass B2, said reading time and said band-pass being tied by the following formula T2 <

$$\left(\frac{1}{2B_2}\right).$$

9. A radar system according to claim 5 wherein switching means has a switching time T1, defined as the time between two successive passages of said switching means assuring the same position;

each channel of said multichannel network has a band-pass, B1; and said switching time and said passband are related by the formula T1 <

$$\left(\frac{1}{2B_1}\right).$$

10. In a radar system, the method of processing a return signal from a target responsive to a transmitted signal, comprising the following steps:

transmitting a signal through an antenna toward a target;
receiving a return signal in response to said transmitted signal;
summing up this received signal with a replica of said transmitted signal to form a composite signal;
applying said composite signal to a multichannel network;
detecting said composite signal in said multichannel network to obtain in a channel a detected signal according to its frequency;
averaging said detected signal;
applying said averaged signal together with the outputs of said multichannel network to the inputs of a switching means whereby to obtain a signal carrying a range information as a function of its frequency;
applying the output of said switching means to a second multichannel network whereby to obtain the required range information at the output of one at least of the channels of said multichannel network.

11. In a radar system, the method of processing the information in the second multichannel, according to claim 10, comprising the following steps:

filtering the signal issued from said switching means and applied to said multichannel network;
detecting said filtered signal, and
integrating said detected signal so as to obtain said required range information at the output of one channel at least of said second multichannel network.

* * * * *

PO-1050
(5/69)

UNITED STATES PATENT OFFICE
CERTIFICATE OF CORRECTION

Patent No. 3,657,738            Dated April 18, 1972

Inventor(s) Michel F. Carpenter et al

It is certified that error appears in the above-identified patent and that said Letters Patent are hereby corrected as shown below:

In the heading, add: "Priority, Application in France, No. PV 176949, December 6, 1968."

Signed and sealed this 5th day of September 1972.

(SEAL)
Attest:

EDWARD M. FLETCHER, JR.            ROBERT GOTTSCHALK
Attesting Officer                    Commissioner of Patents